United States Patent
Uchiyama

[11] Patent Number: 5,821,426
[45] Date of Patent: Oct. 13, 1998

[54] OPTICAL FIBER STRAIN MEASURING APPARATUS

[75] Inventor: Haruyoshi Uchiyama, Tokyo, Japan

[73] Assignee: Ando Electric Co., Ltd., Tokyo, Japan

[21] Appl. No.: 926,577

[22] Filed: Sep. 4, 1997

[30] Foreign Application Priority Data

Sep. 12, 1996 [JP] Japan .................................. 8-242352

[51] Int. Cl.$^6$ ........................................................ G01L 1/24
[52] U.S. Cl. ........................ 73/800; 250/277.19; 356/32
[58] Field of Search ........................ 73/800; 250/277.14, 250/277.21; 356/32

[56] References Cited

U.S. PATENT DOCUMENTS

| | | | |
|---|---|---|---|
| 4,841,778 | 6/1989 | Butler et al. | 73/800 |
| 5,126,558 | 6/1992 | Rogers, Jr. et al. | 73/800 |
| 5,589,641 | 12/1996 | Johnson et al. | 73/800 |

*Primary Examiner*—Max H. Noori
*Attorney, Agent, or Firm*—Darby & Darby

[57] ABSTRACT

The objective of the present invention is to offer an optical fiber strain-measuring apparatus, which allows the measurement of the strain at an arbitrary position within an optical fiber. An optical frequency conversion section 3 shifts, in a step-wise manner for prescribed frequencies, the frequencies of a continuous light emitted from a light source 1. A sound-light switch 4 coverts into pulses the continuous light forwarded from the optical frequency conversion section 3. When those light pulses are entered into a test optical fiber, back-scattered light is generated. An optical directional coupler 11 branches and forwards to an optical ring circuit and to an optical directional coupler 13 the back-scattered light. A photo-electric converter 14 receives employing heterodyne detection and converts into electric signals the synthesized light signals of the back-scattered light forwarded from the optical directional coupler 11 and the continuous light forwarded from the optical directional coupler 2. A signal processing section 18 reads at an arbitrary timing the electric signals, performs necessary processes, and obtains the amount of strain of the test optical fiber 7.

9 Claims, 3 Drawing Sheets

OPTICAL FIBER STRAIN MEASURING APPARATUS

BACKGROUND OF THE INVENTION

1. Technical Field of the Invention

The present invention relates to an optical fiber strain-measuring apparatus which is able to measure the strain of an optical fiber by detecting and analyzing the natural Brillouin scattering of light within an optical fiber.

2. Description of the Related Art

Recently, there are optical fiber strain-measuring apparatuses being developed which measure such properties as strain on an optical fiber by detecting the natural Brillouin scattering of light within an optical fiber and analyzing that scattering of light. The Brillouin Optical Fiber Ring Laser is utilized as an apparatus to measure the properties of an optical fiber employing the above-mentioned natural Brillouin scattering of light. The structure of the Brillouin Optical Fiber Ring Laser will be explained below with reference to FIG. 3.

In this figure, 101 is a light source, which emits continuous light of a referential optical frequency to an optical directional coupler 102. The optical directional coupler 102 branches the continuous light emitted from the light source 101 into a measuring light and a reference light, and forwards the measuring light to a sound-light switch 104 and the reference light to an optical directional coupler 113.

The sound-light switch 104 converts the continuous light which is emitted from the optical directional coupler 102 into light pulses, and forwards light to a light circulator 106 at a frequency determined by the time taken to travel the length of an optical ring circuit (a circuit comprising a test optical fiber 107, an optical fiber amplifier 109, a sound-light switch 123, an optical band pass filter 110, an optical directional coupler 111, a delaying optical fiber 112, and a light isolator 108). While forwarding the light pulses to the above-mentioned optical ring circuit, the light circulator 106 forwards the Brillouin back-scattered light generated inside the test optical fiber 107 to the sound-light switch 123.

The sound-light switch 123 extracts, from the Brillouin back-scattered light, only the back-scattered light generated in a prescribed position within the test optical fiber 107, and forwards that to the optical fiber amplifier 109. The optical fiber amplifier 109 gives an appropriate amplification to the light signals extracted at the sound-light switch 123 to compensate for the light transmission loss of the optical ring circuit.

The optical band pass filter 110 eliminates the spontaneously emitted light and the excited light originated at the optical fiber amplifier 109, and only allows the light signals to pass. The optical directional coupler 111 branches the light signals forwarded from the optical band pass filter 110, and simultaneously forwards one portion to the delaying optical fiber 112 of the optical ring circuit and the other portion to the optical directional coupler 113.

The delaying optical fiber 112 produces a delay in the incident light signals. The light isolator 108 forwards the light signals bearing a delay to the test optical fiber 107, while preventing the measuring light, which was forwarded from the light circulator 106 and which was transmitted through the test optical fiber 107, to pass (in the direction of the delaying optical fiber 112). The light signals forwarded from the light isolator 108 receives a Brillouin amplification at the above prescribed position within the test optical fiber 107, due to the measuring light forwarded from the light circulator 106, and is forwarded to the sound-light switch 123 by the light circulator 106.

The sound-light switch 123 extracts the light signals which received the Brillouin amplification at the above prescribed position within the test optical fiber 107 and forwards the light signals to the optical fiber amplifier 109. These light signals pass through the optical fiber amplifier 109 and the optical band pass filter 110 and branch at the optical directional coupler 111 toward the optical ring circuit and toward the optical directional coupler 113. The repetition of this operation causes the light signals extracted at the above prescribed position to receive a Brillouin amplification each time the optical ring circuit is circled.

Meanwhile, the optical directional coupler 113 synthesizes the light signals forwarded from the secondary route of the optical directional coupler 111 and the reference light forwarded from the secondary route of the optical directional coupler 102, and forwards the synthesized light to a light-intercepting section 121. The light-intercepting section 121 receives the light signals forwarded from the optical directional coupler 113 and converts the light signals into electric signals. An electrical spectrum analyzer 122 detects the electric signals and measures the amount of strain at the above prescribed position within the test optical fiber 107.

It should be noted that with respect to the above-described conventional optical fiber strain-measuring apparatus, there is a problem of the position where the strain is measured (i.e., the above-mentioned prescribed position) being limited by the timing at which the sound-light switch 123 extracts the Brillouin scattering light.

In addition, with respect to the above-described conventional optical fiber strain-measuring apparatus, there is a problem of not easily detecting the electric signals due to the high frequency band of the synthesized light signals formed by the reference light and the light signals outputted from the optical ring circuit, being approximately 10–12 GHz.

In addition, with respect to the above-described conventional optical fiber strain-measuring apparatus, there is a problem of not being able to measure the length of the optical ring circuit, which is also the cycle at which the measuring light is forwarded.

SUMMARY OF THE INVENTION

The present invention is conceived under such background, and hence, proposes to offer an optical fiber strain-measuring apparatus, which allows the measurement of the strain at an arbitrary position within an optical fiber, and which allows the measurement of the length of the optical ring circuit containing the optical fiber.

The present invention comprises a light source, which emits continuous light of a referential optical frequency, a primary optical directional coupling means for forwarding after branching the continuous light into two, an optical frequency converting means for shifting the optical frequency of the first branch of the continuous light forwarded from the primary optical directional coupling means in a step-wise manner for prescribed frequencies during a given cycle, a pulsing means for converting the light signals forwarded from the optical frequency converting means into pulses and for forwarding the light pulses at a prescribed interval of time, an optical ring circuit, whose length defines the rate at which the pulses are forwarded by the pulsing means, and which comprises a test optical fiber, which is the object of the strain measurement, a light circulating means for forwarding the light pulses forwarded from the pulsing means to the test optical fiber, while receiving and forwarding the back-scattered light signals generated within the test optical fiber without changing their direction of propagation, a light amplifying means for amplifying the back-scattered light signals forwarded from the light circulating means, an optical noise eliminating means for eliminating the noise component generated by the light amplifying means from the back-scattered light signals amplified by the light amplifying means, a secondary optical directional coupling means for forwarding after branching the back-scattered light signals forwarded from the optical noise eliminating means, a delaying means for applying a delay to the first branch of the back-scattered light signals forwarded from the secondary optical directional coupling means, and a light insulating means for interrupting the light pulses, which have passed through the test optical fiber, while forwarding to the test optical fiber the back-scattered light signals forwarded from the delaying means, a tertiary optical directional coupling means for synthesizing the second branch of the back-scattered light signals forwarded from the secondary optical directional coupling means with the second branch of the continuous light forwarded from the primary optical directional coupling means, a light intercepting means for using a heterodyne reception process to receive the light signals forwarded from the tertiary optical directional coupling means, i.e. the continuous light forwarded from the primary optical directional coupling means and the back-scattered light signals forwarded from the secondary optical directional coupling means, and for converting the light signals into electric signals, and a signal processing means for measuring the strain of the test optical fiber by using the electric signals outputted from the light intercepting means.

According to the present invention, signal detection is facilitated, because the frequency band of the light signals to be detected can be made low.

Additionally, according to the present invention, the amount of strain at an arbitrary position within the test optical fiber can be obtained by changing the read timing of the digital signals outputted from the A/D converting section, as well as the space distribution of the strain by reading the signals at a certain number of different timings.

Additionally, according to the present invention, the length of the optical light circuit can be measured.

DETAILED DESCRIPTION OF THE PREFERRED EMBODIMENTS OF THE INVENTION

An embodiment of the present invention will be explained below with reference to drawings.

Figure 1:
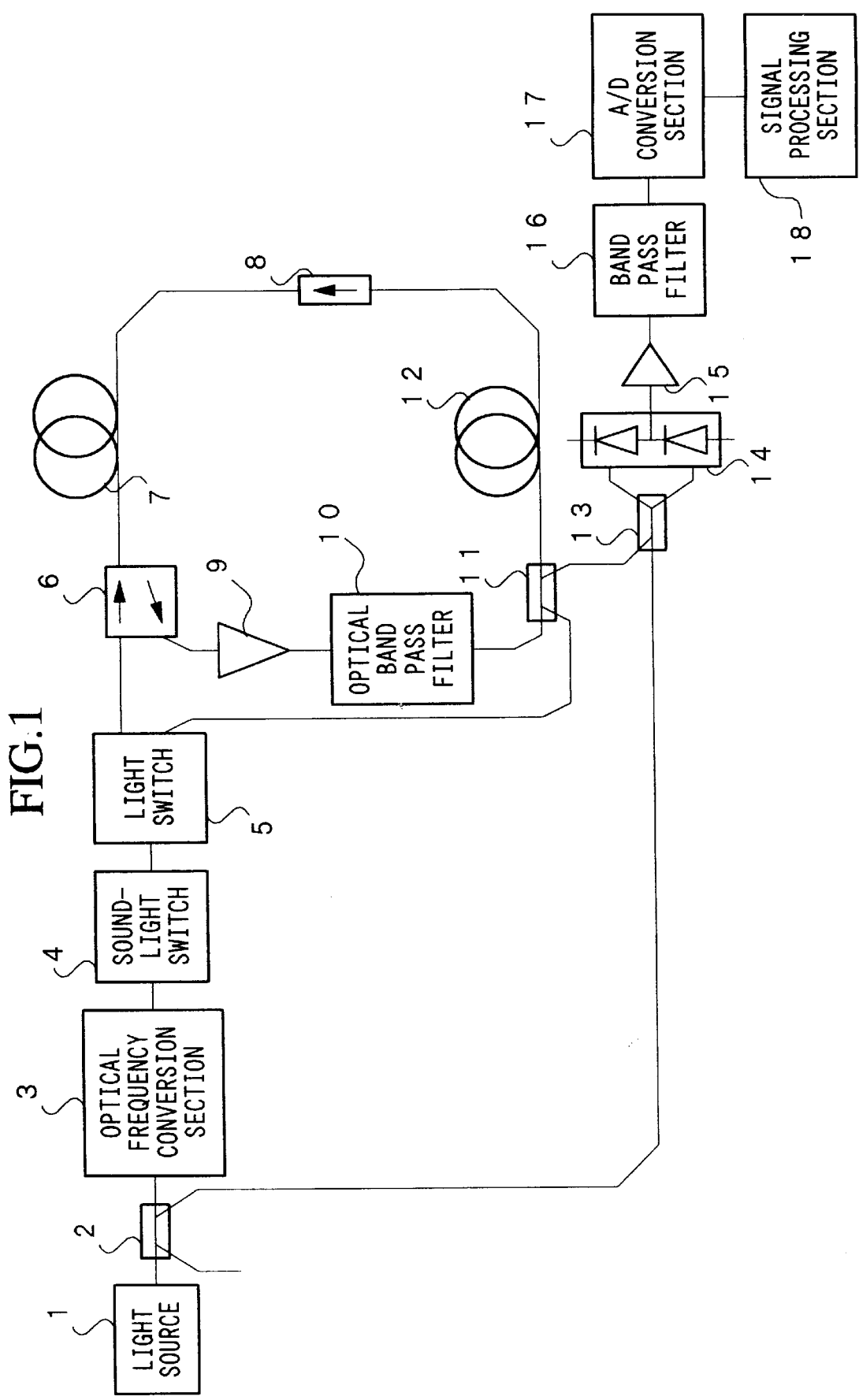
FIG. 1 is a block diagram illustrating an example of an structure of an optical fiber strain-measuring apparatus according to an embodiment of the present invention.

FIG. 1 is a block diagram illustrating an example of a structure of an optical fiber strain-measuring apparatus according to an embodiment of the present invention.

With reference to this diagram, 1 is a light source, which emits continuous light of a referential optical frequency, and for example a MQW-DFB-LD with a frequency band of 1.55 $\mu$m possessing ATC (Automatic Temperature Control) is employed. 2 is an optical directional coupler, and the continuous light entering into the light entering port is split into two and is exited through the two light exiting ports. 3 is an optical frequency conversion section, which converts the entering continuous light into a stream of light pulses, which have had their frequencies shifted in a step-wise manner for prescribed frequencies.

Figure 2:
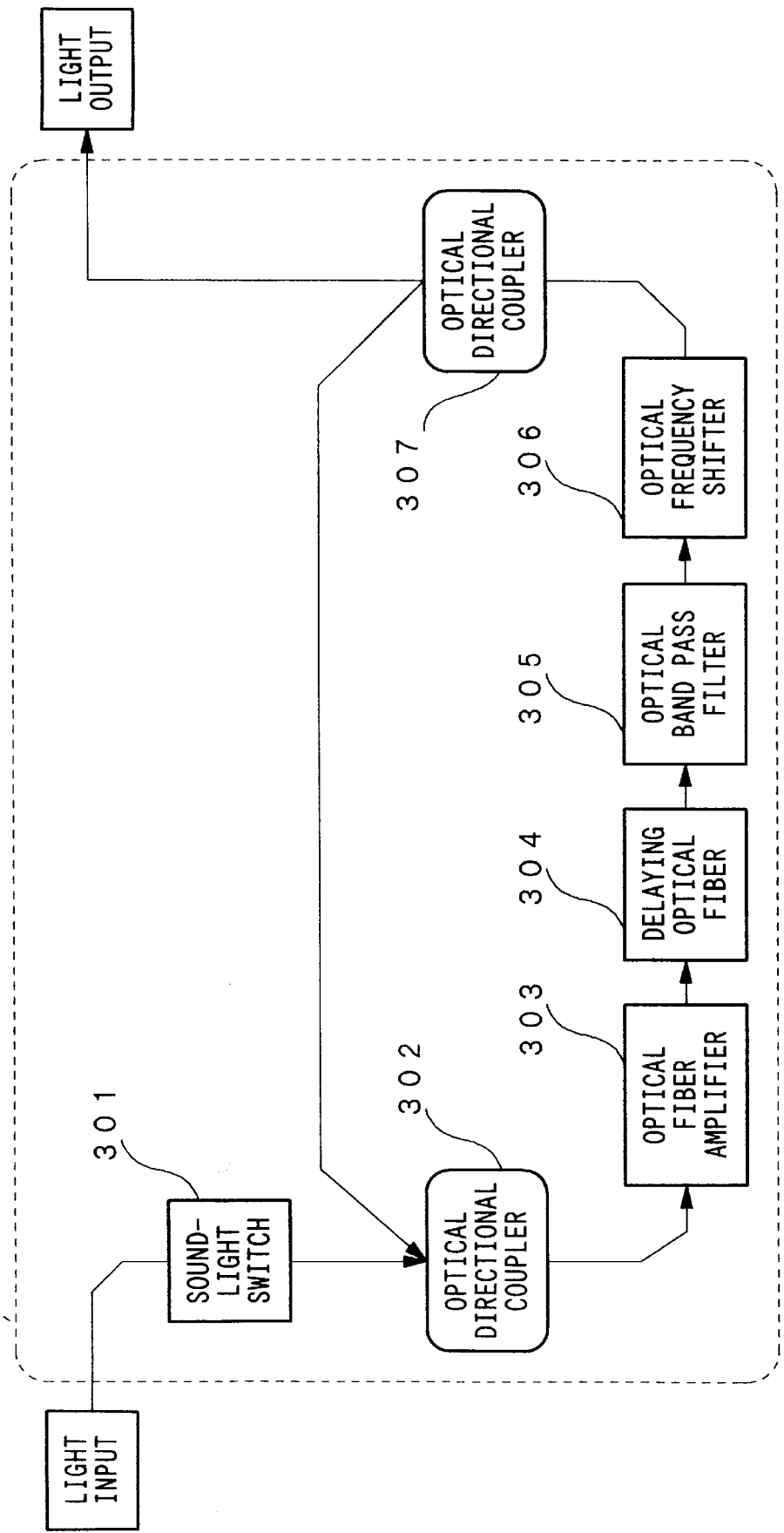
FIG. 2 is a block diagram illustrating an example of an structure of the optical frequency conversion section 3 according to the embodiment of FIG. 1.
Figure 3:
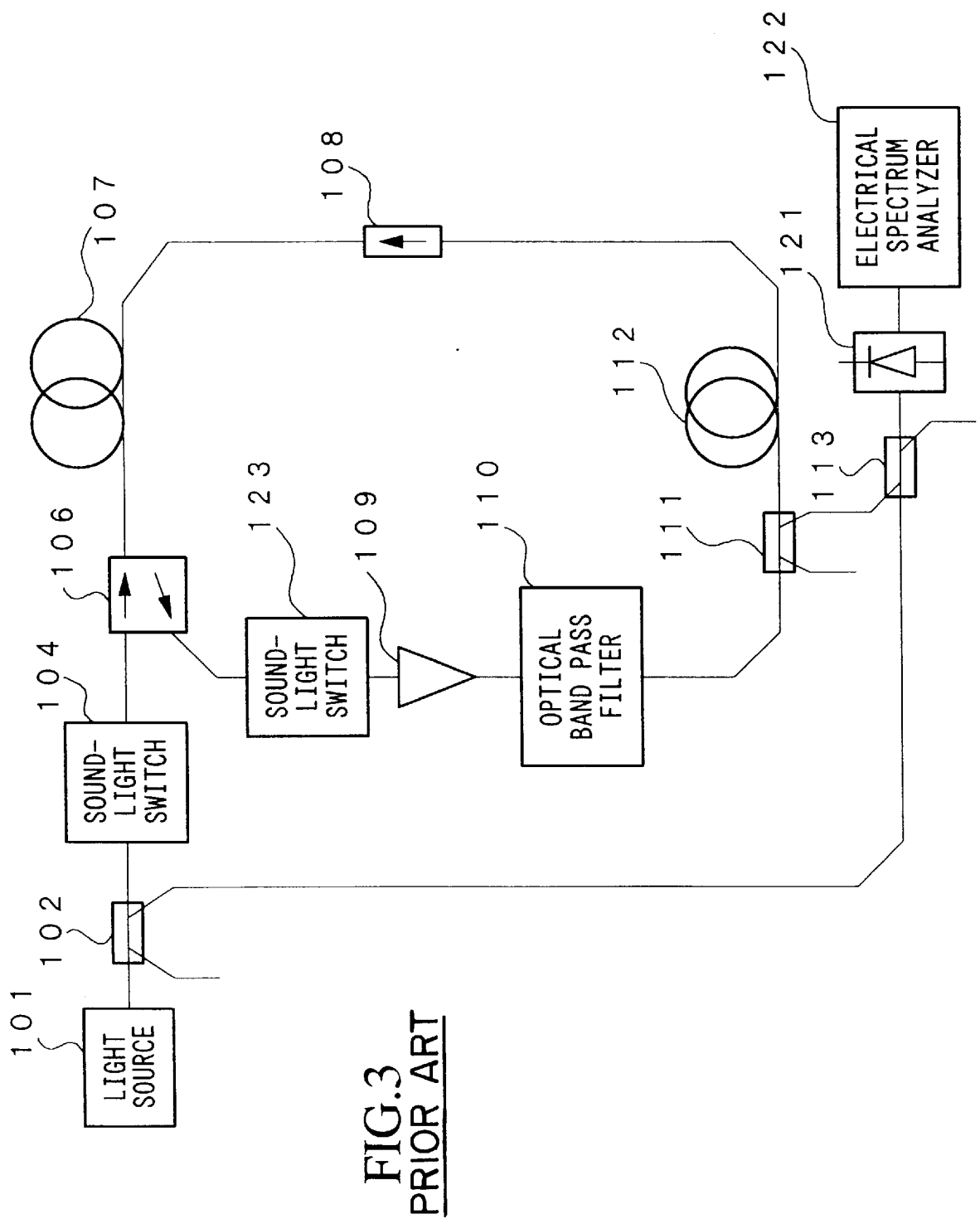
FIG. 3 is a block diagram illustrating an example of an structure of a conventional optical fiber strain-measuring apparatus.

FIG. 2 is a block diagram illustrating an example of a structure of the optical frequency conversion section 3.

With reference to this diagram, 301 is a sound-light switch, which converts the continuous light into light pulses. 302 is an optical directional coupler, which synthesizes and forwards the light signals entering through two light entering ports to a light exiting port. 303 is an optical fiber amplifier, which amplifies the entering light signals. 304 is a delaying optical fiber, which delays the entering light signals by a prescribed amount of time. 305 is an optical band pass filter, which possesses, for example, a light transmission band of 5 nm. 306 is an optical frequency shifter, which with dependence on external control signals, shifts the frequencies of the entering light signals by an amount identical to that of a RF oscillator (not illustrated). Such a RF oscillator may, for example, have frequencies ranging from 120 to 122 MHz. 307 is an optical directional coupler, which splits and forwards the light signals entering through a light entering port to two light exiting ports.

Returning back to FIG. 1, 4 is a sound-light switch, which with dependence on external control signals, switches on and off the entering light signals. 5 is a light switch, which when the strain of a test optical fiber is being measured, forwards to a light circulator 6 the light pulses entering from the sound-light switch. Then, the light switch 5 forwards to an optical directional coupler 11 the light pulses entered from the sound-light switch 4, when the length of an optical ring circuit (a circuit formed by the light circulator 6, an optical fiber amplifier 9, an optical band pass filter 10, a delaying optical fiber 12, a light isolator 8, and the test optical fiber 7) is being measured.

6 is the light circulator, which allots light exiting ports to the light signals entering each port. 7 is the test optical fiber, which is the subject of the measurement of the present measuring apparatus. 8 is the light isolator, which restricts the direction of propagation of the light signals and allows propagation in only one direction. 9 is the optical fiber amplifier, which amplifies the entering light signals. The optical fiber amplifier, for example, can comprise an $Er^{3+}$ doped fiber and a light source for exciting the doped fiber, such as a 1.48 $\mu$m semiconductor laser diode. 10 is the optical band pass filter, which may, for example, possess a passing band of 5 nm. 11 is the optical directional coupler, which possesses two light entering ports and two light exiting ports, and which forwards through the appropriate light exiting ports the light signals, which have entered through the two light entering ports. 12 is the delaying optical fiber, which applies a delay to the entering light signals. The length of the delaying optical fiber 12 is greater or equal to that of the test optical fiber.

13 is an optical directional coupler, which possesses two light entering ports and two light exiting ports, and which forwards through the appropriate light exiting ports the light signals, which have entered through the two light entering ports. 14 is a photoelectric converter, which converts the supplied light signals into electric signals. 15 is an amplifier, which amplifies the inputted electric signals. 16 is a band pass filter, which eliminates the noise component and allows only the signal component to transmit through. 17 is an analog-digital conversion section, which converts the inputted analog signals into digital signals. 18 is a signal processing section, which performs a prescribed process on the supplied electric signals and obtains the amount of strain of the test optical fiber 7.

Next, the operation of the above-described optical fiber strain-measuring apparatus will be explained with reference to FIGS. 1 and 2.

The continuous light that is emitted from the light source 1 is branched by the optical directional coupler 2 and are forwarded to the optical frequency conversion section 3 and to the optical directional coupler 13. The frequency of the continuous light at this point will be represented by $f_o$.

The continuous light which is forwarded to the optical frequency conversion section 3 is converted, at the optical frequency conversion section 3, into a stream of light pulses whose frequencies have been shifted in a step-wise manner for prescribed frequencies. This process will be described in detail below.

First, the continuous light that is forwarded to the optical frequency conversion section 3 is modulated as light pulses by a sound-light switch 301 illustrated in FIG. 2. The pulse width of these light pulses may be, for example, 2 $\mu$s. Additionally, the cycle of these light pulses are dependent on the length of the above-mentioned optical ring circuit. The length of this optical ring circuit for the present embodiment may be, for example, 400 $\mu$s with time conversion, and this amount of time will be the cycle of the light pulses.

The light pulses forwarded by the sound-light switch 301 are entered into an optical loop comprising an optical directional coupler 302, an optical fiber amplifier 303, a delaying optical fiber 304, an optical band pass filter 305, an optical frequency shifter 306, and an optical directional coupler 307.

The light pulses entering the optical loop receives, at the optical fiber amplifier 303, an amount of amplification equal to that of loss from the optical loop, receives, at the delaying optical fiber 304, a delay greater or equal to the pulse width of the light pulses, passes through the optical band pass filter 305, receives, at the optical frequency shifter 306, a shift in the optical frequency for frequencies of a RF oscillator, and is branched, at the optical directional coupler 307, into light pulses forwarded out from the optical frequency conversion section 3 and into light pulses forwarded back into the optical loop.

Through this process, the optical frequency of the light pulses forwarded from the optical directional coupler 307 are shifted, in relation to that of the original light pulses entering into the optical frequency conversion section 3.

By repeating the identical operation, a stream of light pulses whose optical frequencies are shifted in a step-wise manner for frequencies of a RF oscillator (e.g., 120 MHz) is forwarded from the light exiting port of the optical directional coupler 307. This stream of light pulses will be the output of the optical frequency conversion section 3.

The stream of light pulses is forwarded from the optical frequency conversion section 3 to the sound-light switch 4, where light pulses possessing only a desired optical frequency component are extracted from the stream of light pulses (the extracted light pulses hereinafter referred to as "pumped light"). This pumped light then passes through the light switch 5 and is forwarded to the light circulator 6.

A desired frequency of the light pulses to be extracted is determined by setting both the frequency of the RF oscillator and the number of times the optical frequency shifter 3 is passed, that is, the number of times the optical loop is traveled (the position within the stream of pulses at which the pulses are extracted). For example, (the optical frequency of) the light pulses may receive an optical frequency shift of approximately 10–12 GHz which is identical to a Brillouin frequency shift. Additionally, the pulse width of the light pulses is determined by the length of time the sound-light switch 4 is in the on position, and may be, for example, 1 $\mu$s. Additionally, the cycle of the light pulses matches the cycle at which the pulsing is performed by the sound-light switch 301 within the optical frequency conversion section 3 (i.e., the length of the optical ring circuit). The frequency of the light pulses at this point will be represented by $f_o+\Delta f$.

The light circulator 6 forwards to the test optical fiber 7 the light pulses extracted by the sound-light switch 4. The incident light pulses travels the entire length of the test optical fiber 7, and a Brillouin scattering, accompanying the frequency shift $f_b$ of approximately 10–12 GHz, occurs.

The Brillouin back-scattered light generated by the Brillouin scattering passes through the light circulator 6 and is forwarded to the above-mentioned optical ring circuit. At this point, the optical fiber amplifier 9 gives an appropriate amplification to the Brillouin back-scattered light to compensate for the light transmission loss of the optical ring circuit. Additionally, the optical band pass filter 10 eliminates the spontaneously emitted light and the excited light originated at the optical fiber amplifier 9.

Next, the Brillouin back-scattered light branches at the optical directional coupler 11 to the optical ring circuit and to the optical directional coupler 13.

The Brillouin back-scattered light forwarded to the optical ring circuit, after receiving a delay by the delaying optical fiber 12 equivalent to that of the test optical fiber 7, passes through the light isolator 8, and enters the test optical fiber 7 from an end opposite to that where the pumped light enters. At this point, the light pulses (pumped light) is entered into the test optical fiber 7 beforehand by the light circulator 6 at a cycle identical to that determined by the length of the optical ring circuit, and the Brillouin back-scattered light which has propagated through the optical ring circuit collides with the light pulses (pumped light) at a position identical to that where the Brillouin scattering originated beforehand. Since the frequency of the Brillouin back-scattered light is $f_o+\Delta f+f_b$ and the frequency of the pumped light is $f_o+\Delta f$, their difference is $f_b$ which is same as the value of the Brillouin frequency shift. When light signals with this kind of difference in frequencies collide, a Brillouin amplification phenomenon occurs, whereby the Brillouin back-scattered light is amplified.

In addition, since the pumped light forwarded by the light circulator 6, after passing through the test optical fiber 7, is interrupted by the light isolator 8, it does not propagate through the entire optical ring circuit.

The Brillouin amplified back-scattered light passes through the light circulator 6 in the same manner as the former Brillouin back-scattered light, and after receiving an amplification by the optical fiber amplifier 9, passes through the optical band pass filter 10, and is forwarded to the optical directional coupler 11.

The optical directional coupler 11 branches the entering light once again. The branching Brillouin amplified back-scattered light is directed both back into the optical ring circuit and toward the optical directional coupler 13.

The back-scattered light forwarded to the optical ring circuit collides, inside the test optical fiber 7, with the pumped light forwarded from the light circulator 6 in the same manner as described above, and is consequently amplified. In this fashion, the Brillouin back-scattered light undergoes Brillouin amplification within the test optical fiber 7 each time the entire cycle of the optical ring circuit is completed.

Meanwhile, the back-scattered light forwarded from the optical directional coupler 11 to the optical directional coupler 13 is synthesized with the reference light from the continuous light with a frequency component of $f_o$ forwarded from the optical directional coupler 2.

The light signals forwarded from the optical directional coupler 13 is received by the photo-electric converter 14 and is converted into electric signals. The photo-electric converter 14 detects only signals of a low band with a frequency component of $\Delta f - f_b$. Additionally, the frequency band of the light signals that can be detected is in the range of several hundred MHz; and the light signals can be converted into electric signals when the amount of frequency shift $\Delta f$ by the optical frequency conversion section 3 and the amount of Brillouin frequency shift $f_b$ generated within the test optical fiber 7 is almost identical.

Afterwards, the amplifier 15 amplifies the level of the converted electric signals. The band pass filter 16 eliminates the noise component from the amplified electric signals and transmits only the signal component. The A/D conversion section 17 converts the electric signals (analog signals) into digital signals.

The signal processing section 18 samples the digital signals at an arbitrary timing, performs necessary processes, and detects the amount of strain. By controlling the sampling timing at this point, the Brillouin back-scattered light from a desired position within the test optical fiber 7 can be detected, and consequently the amount of strain can be obtained. Additionally, by providing a plurality of sampling timings, the amount of strain of a plurality of different positions within the test optical fiber 7 can be detected, and the space distribution of the strain can be measured.

Next, the operation of the present apparatus when the length of the optical ring circuit is being measured will be explained. In this case, since the operations of the light source 1, the optical directional coupler 2, the optical frequency conversion section 3, and the sound-light switch 4, when excluding the fact that the light pulse entering the light switch 5 is a single pulse (i.e., it is not a repeated pulse), are identical to those when the strain is being measured, their explanations will be omitted.

Next, the light switch 5, when the length of the optical ring circuit is being measured, forwards the light pulses from the sound-light switch 4 to the optical directional coupler 11. The optical directional coupler 11 branches into two the light pulses forwarded from the light switch 5, and forwards the light pulses from the primary route to the optical ring circuit, while forwarding the light pulses from the secondary route to the optical directional coupler 13. Additionally, the optical directional coupler 11 forwards to the tertiary optical directional coupler the light pulses, which have been forwarded to the optical ring circuit through the primary route of the optical directional coupler 11 beforehand and which have propagated through the optical ring circuit.

The optical directional coupler 13 forwards to the light intercepting section the two types of light pulses forwarded from the optical directional coupler 11 (the light pulses which have not propagated through the optical ring circuit and the light pulses which have propagated through the optical ring circuit). The photo-electric converter 14 converts the two types of light pulses into electric signals. The signal processing section 18 detects the two types of light pulses, which have been converted into electric signals, and by measuring the interval of both light pulses, obtains the length of the optical ring circuit using the measured interval and the propagation speed of the light pulses.

An embodiment of the present invention has been described in detail with reference to drawings thereof, but it will be understood that variations and modifications can be effected within the spirit and scope of the invention.

What is claimed is:

1. An optical fiber strain-measuring apparatus, comprising:

a light source, which emits continuous light of a referential optical frequency;

a primary optical directional coupling means for forwarding after branching said continuous light into two;

an optical frequency converting means for shifting the optical frequency of the first of the two branches of the continuous light forwarded from said primary optical directional coupling means in a step-wise manner for prescribed frequencies during a given cycle;

a pulsing means for converting the light signals forwarded from said optical frequency converting means into pulses and for forwarding said light pulses at a prescribed interval of time;

an optical ring circuit, whose length defines the rate at which the pulses are forwarded by said pulsing means, which comprises a test optical fiber, which is the object of the strain measurement, a light circulating means for forwarding the light pulses forwarded from said pulsing means to said test optical fiber, while receiving and forwarding the back-scattered light signals generated within said test optical fiber without changing their direction of propagation, a light amplifying means for amplifying the back-scattered light signals forwarded from said light circulating means, an optical noise eliminating means for eliminating the noise component generated by said light amplifying means from the back-scattered light signals amplified by said light amplifying means, a secondary optical directional coupling means for forwarding after branching the back-scattered light signals forwarded from said optical noise eliminating means, a delaying means for applying a delay to the first of the two branches of the back-scattered light signals forwarded from said secondary optical directional coupling means, and a light insulating means for interrupting the light pulses, which have passed through said test optical fiber, while forwarding to said test optical fiber the back-scattered light signals forwarded from said delaying means;

a tertiary optical directional coupling means for synthesizing the second of the two branches of the back-scattered light signals forwarded from said secondary optical directional coupling means with the second of the two branches of the continuous light forwarded from said primary optical directional coupling means;

a light intercepting means for using a heterodyne reception process to receive the light signals forwarded from said tertiary optical directional coupling means, i.e. the continuous light forwarded from said primary optical directional coupling means and the back-scattered light signals forwarded from said secondary optical directional coupling means, and for converting the light signals into electric signals; and a signal processing means for measuring the strain of said test optical fiber by using the electric signals outputted from said light intercepting means.

2. An optical fiber strain-measuring apparatus in accordance with claim 1, wherein the amount of the frequency shift according to the said optical frequency converting means can be arbitrarily set.

3. An optical fiber strain-measuring apparatus according to claims 1 or 2, wherein the amount of the frequency shift according to the said optical frequency converting means is identical to that of a Brillouin frequency shift of approximately 10–12 GHz.

4. An optical fiber strain-measuring apparatus according to claims 1 or 2, wherein said signal processing means comprises:
- an amplifying section, which amplifies the electric signals outputted from said light intercepting means;
- a band pass filter, which allows the transmission of only the signal component of the electric signals amplified by said amplifying section;
- an A/D converting section, which converts into digital signals the electric signals outputted from said band pass filter; and
- a signal processing section, which reads at variable timings the digital signals outputted from said A/D converting section, and which obtains the strain of said test optical fiber based on said digital signals.

5. An optical fiber strain-measuring apparatus in accordance with claim 3, wherein said signal processing means comprises:
- an amplifying section, which amplifies the electric signals outputted from said light intercepting means;
- a band pass filter, which allows the transmission of only the signal component of the electric signals amplified by said amplifying section;
- an A/D converting section, which converts into digital signals the electric signals outputted from said band pass filter; and
- a signal processing section, which reads at variable timings the digital signals outputted from said A/D converting section, and which obtains the strain of said test optical fiber based on said digital signals.

6. An optical fiber strain-measuring apparatus according to claims 1 or 2, further comprising a light switch, which forwards to either said light circulating means or said secondary optical directional coupling means the light pulses forwarded from said pulsing means, and wherein:
- said secondary optical directional coupling means branches into two the light pulses forwarded from said light switch, forwards to said delaying means the first of the two branches, and forwards to said tertiary optical directional coupling means the second of the two branches, while forwarding to said tertiary optical directional coupling means the light pulses, which have been forwarded from said secondary optical directional coupling means to said delaying means and which have propagated through said optical ring circuit;
- said tertiary optical directional coupling means forwards the light pulses forwarded from said secondary optical directional coupling means, that is, the light pulses which have not propagated through said optical ring circuit and the light pulses which have propagated through said optical ring circuit;
- said light intercepting means converts into electric signals both the light pulses which have not propagated through said optical ring circuit and the light pulses which have propagated through said optical ring circuit; and
- said signal processing means measures the interval of the light pulses indicated by the electric signals outputted from said light intercepting means, and obtains the length of said optical ring circuit based on said interval and the propagation speed of said light pulses.

7. An optical fiber strain-measuring apparatus in accordance with claim 3, further comprising a light switch, which forwards to either said light circulating means or said secondary optical directional coupling means the light pulses forwarded from said pulsing means, and wherein:
- said secondary optical directional coupling means branches into two the light pulses forwarded from said light switch, forwards to said delaying means the first of the two branches, and forwards to said tertiary optical directional coupling means the second of the two branches, while forwarding to said tertiary optical directional coupling means the light pulses, which have been forwarded from said secondary optical directional coupling means to said delaying means and which have propagated through said optical ring circuit;
- said tertiary optical directional coupling means forwards the light pulses forwarded from said secondary optical directional coupling means, that is, the light pulses which have not propagated through said optical ring circuit and the light pulses which have propagated through said optical ring circuit;
- said light intercepting means converts into electric signals both the light pulses which have not propagated through said optical ring circuit and the light pulses which have propagated through said optical ring circuit; and
- said signal processing means measures the interval of the light pulses indicated by the electric signals outputted from said light intercepting means, and obtains the length of said optical ring circuit based on said interval and the propagation speed of said light pulses.

8. An optical fiber strain-measuring apparatus in accordance with claim 4, further comprising a light switch, which forwards to either said light circulating means or said secondary optical directional coupling means the light pulses forwarded from said pulsing means, and wherein:
- said secondary optical directional coupling means branches into two the light pulses forwarded from said light switch, forwards to said delaying means the first of the two branches, and forwards to said tertiary optical directional coupling means the second of the two branches, while forwarding to said tertiary optical directional coupling means the light pulses, which have been forwarded from said secondary optical directional coupling means to said delaying means and which have propagated through said optical ring circuit;
- said tertiary optical directional coupling means forwards the light pulses forwarded from said secondary optical directional coupling means, that is, the light pulses which have not propagated through said optical ring circuit and the light pulses which have propagated through said optical ring circuit;
- said light intercepting means converts into electric signals both the light pulses which have not propagated through said optical ring circuit and the light pulses which have propagated through said optical ring circuit; and
- said signal processing means measures the interval of the light pulses indicated by the electric signals outputted from said light intercepting means, and obtains the length of said optical ring circuit based on said interval and the propagation speed of said light pulses.

9. An optical fiber strain-measuring apparatus in accordance with claim 5, further comprising a light switch, which forwards to either said light circulating means or said secondary optical directional coupling means the light pulses forwarded from said pulsing means, and wherein:

said secondary optical directional coupling means branches into two the light pulses forwarded from said light switch, forwards to said delaying means the first of the two branches, and forwards to said tertiary optical directional coupling means the second of the two branches, while forwarding to said tertiary optical directional coupling means the light pulses, which have been forwarded from said secondary optical directional coupling means to said delaying means and which have propagated through said optical ring circuit;

said tertiary optical directional coupling means forwards the light pulses forwarded from said secondary optical directional coupling means, that is, the light pulses which have not propagated through said optical ring circuit and the light pulses which have propagated through said optical ring circuit;

said light intercepting means converts into electric signals both the light pulses which have not propagated through said optical ring circuit and the light pulses which have propagated through said optical ring circuit; and said signal processing means measures the interval of the light pulses indicated by the electric signals outputted from said light intercepting means, and obtains the length of said optical ring circuit based on said interval and the propagation speed of said light pulses.

* * * * *